United States Patent Office 3,420,418
Registered Jan. 7, 1969

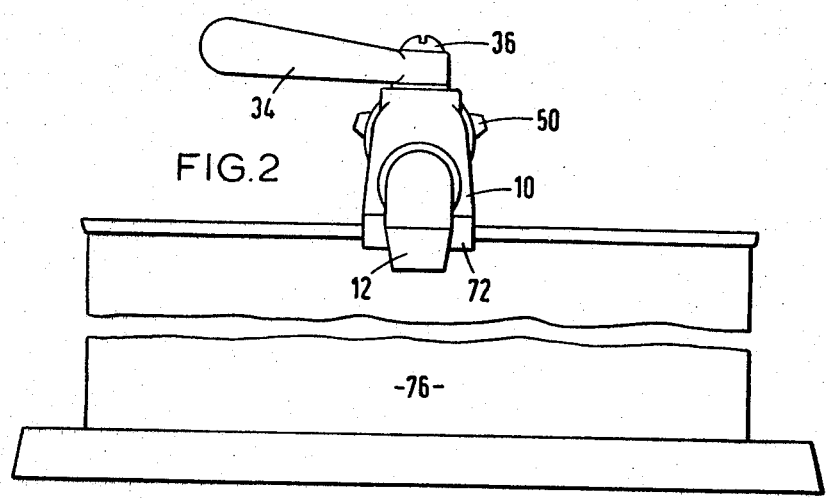
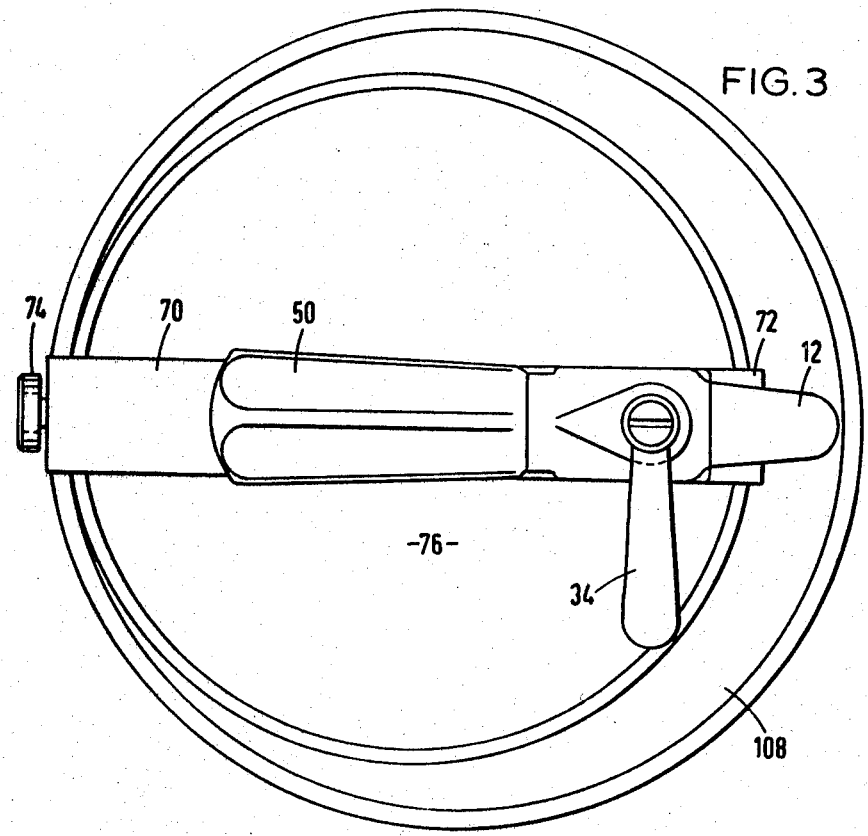

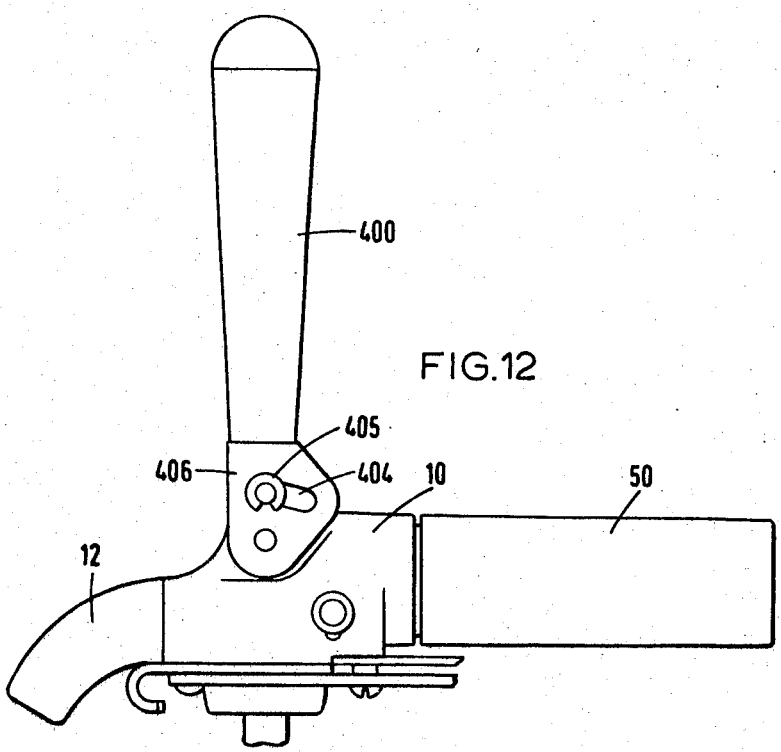
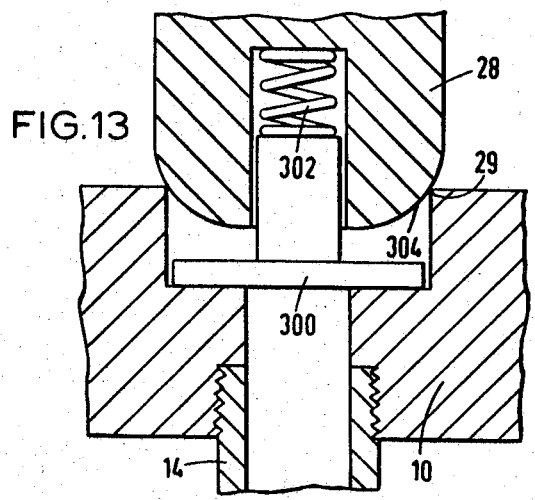

3,420,418
VALVE ASSEMBLY AND MECHANISM
Rene P. Rousset, Potters Bar, and Brian S. Bennett, London, England, assignors to British Oxygen Company Limited, a British company
Filed Feb. 4, 1966, Ser. No. 525,023
Claims priority, application Great Britain, Feb. 12, 1965, 6,200/65; Nov. 22, 1965, 49,578/65
U.S. Cl. 222—399                11 Claims
Int. Cl. B65d 83/06; B67b 7/24; 7/26

ABSTRACT OF THE DISCLOSURE

A valve assembly suitable for attachment to a cylindrical liquid container, comprising: (A) a valve mechanism including a manually operable tap and a liquid valve member thereof adapted in cooperation to control flow of liquid from the container; (B) a tube in fluid communication with the tap and depending from the valve mechanism and adapted to extend through an aperture in one end wall of the container and terminate adjacent the opposite end wall; (C) clamping means adapted to grip the container and to position the valve mechanism so that the tube extends through said aperture; (D) annular sealing means surrounding the said aperture and compressed against the end wall of the container by the clamping means; (E) a holder for a bulb of compressed gas, such as carbon dioxide, carried by and fixed in relation to the clamping means; (F) the said valve mechanism including (a) a valve actuating member in operative relationship with the said tap and with the said liquid valve member; and (b) a gas valve member including a piercing/sealing pin adapted to pierce an end of the said bulb and capable of sealing the orifice so produced; (G) the said valve actuating member having a cam surface arranged to effect upon movement thereof by the agency of the tap movement of the said pin in a direction longitudinal of the pin to allow escape of gas into the container.

---

This invention relates to a valve assembly suitable for attachment to a liquid container, and to a valve mechanism for dispensing a pressurised liquid in such a container. The invention has particular though not exclusive application to the dispensing of beer or other beverage from disposable containers such as cylindrical beer cans known as "pipkins" which may contain about 4–10 pints of beer. Common sizes of can are the 4-pint can and the 7-pint can. Some of these cans when sold have one or more apertures in one end normally closed by a rubber or other bung.

With such cans, once they have been opened to atmosphere, beer tends to deteriorate if not used within a few hours. Also, pouring from such a large can is inconvenient and frequently results in undesirable spillage. These disadvantages are substantially overcome by the provision of a removable valve assembly which can be attached to the container and by means of which beer (or other beverage) can be dispensed from the container while it is in its normal vertical position.

According to the invention, we provide a valve assembly suitable for attachment to a cylindrical liquid container, comprising a valve mechanism including a manually operable tap adapted to control flow of liquid from the container, and including a tube depending from the valve mechanism and adapted to extend through an aperture in one end wall of the container and down below the liquid surface, clamping means adapted to grip the container and to position the valve mechanism so that the tube extends through the said aperture, annular sealing means surrounding the said aperture and compressed against the end wall of the container by the clamping means, a holder for a bulb of compressed gas, such as carbon dioxide, carried by the clamping means, gas from the bulb being arranged to enter the container through the aperture and within the annular sealing means.

In a preferred embodiment of the invention, the manually operable tap is arranged to control both a valve member controlling the outflow of liquid and a gas valve member controlling release of the gas from the bulb. Advantageously the tap is arranged to effect sequential control of the liquid and gas valves so that the former opens before and closes after the latter. Sequential valve operation is desirable so that gas is supplied to the container only when liquid is to be drawn off, and preferably only for part of the time that liquid is actually flowing. Alternatively, separate valves, both mounted on the clamping means may be provided to control the outflow of liquid and release of gas. With this alternative, the valves may be interlocked so that the container cannot be pressurised by release of gas unless the liquid valve is open. With any of these arrangements, it will normally be desirable to include a pressure relief valve.

The preferred form of clamping means includes a flexible or springy strap capable of extending diametrically across the end of the liquid container (can) and clipping over the rim of the can at each end of the diameter. With conventional cans the end wall flexes or distorts outwardly on increase of pressure in the can, and its shape changes with change of internal pressure. The springy strap can follow these movements and the clip or clips at the end or ends of the strap tends to grip the can rim better as the pressure rises. The clamping means may be arranged to clip over the circular rim surrounding the end wall and may include a springy strap member with a curved clip at one end and a clamping screw at the other end.

According to a particularly advantageous feature of the present invention the valve assembly comprises a valve mechanism including a manually operable tap adapted to control flow of liquid from the container, and a pressure-responsive valve arranged so that liquid can only flow from the container to the exterior when the pressure in the container is greater than a predetermined level.

The provision of the pressure-responsive valve is intended to mitigate or overcome the problem that the bulb containing liquified gas, which is of standard size, gives just sufficient pressurised gas to dispense the liquid in one of the larger containers. In a typical operating cycle, the liquid valve is opened and gas from the bulb is released to force the liquid out of the can. If each time the valve is opened the pressure within the can is allowed to fall to atmospheric or nearly atmospheric pressure, carbon dioxide dissolved in the beer is able to escape and the beer thus goes "flat."

In an advantageous embodiment of this aspect of the invention, the said pressure-responsive valve comprises a valve member urged to its closed position by a spring, and a spring seat acting as an abutment for the spring is on or forms part of a movable valve member comprising part of the said valve mechanism controlling liquid flow from the container. The effect of this arrangement is to allow the pressure-responsive valve member to open at a lower pressure than normal internally of the container when the said tap is in its fully opened position. When the tap is not fully open, the liquid cannot escape from the container until the internal pressure rises above the predetermined level. With a large container, the gas available from the bulb may be only just sufficient to discharge all the liquid, and when only a small quantity of liquid remains, it has been found advantageous to arrange for the pressure-responsive valve to open at pressures less than the predetermined value. Thus when the tap is fully open, a smaller internal pressure is needed to open the pressure-responsive valve, and the residual liquid can thus be expelled by the reduced pressure available when the bulb is nearly empty.

According to another advantageous embodiment of this aspect of the invention, the manually operable tap is movable in a vertical plane, and is linked to the valve member of the said pressure-responsive valve by a mechanical connection, for example an arcuate slot whose two sides serve as cam surfaces engaging a cross-head attached to the valve member to provide a positive opening and closing drive for the said valve member.

Yet another advantageous feature of the invention is that the valve assembly includes clamping means adapted to grip the container to secure the assembly thereto in the form of an adjustable strap having two elements, one of which is slidable relative to the other, and the elements are hooked or otherwise shaped so as to be engageable one with the other at a plurality of selectable positions so as to give overall strap lengths appropriate to containers of different sizes.

In an alternative embodiment of the invention intended to facilitate fixing of the valve assembly to cans of different sizes, the assembly is secured to one strap element adapted at one end to engage the lip of the can and the strap element carries a securing screw or the like by which a selected one of several other strap elements of lengths appropriate to the size of the can involved can be secured to the valve assembly.

According to yet a further advantageous feature of the invention, the valve assembly has a delivery pipe or spout which is provided with a vent hole whose inner end is located close to the valve member of the main liquid valve, in order to substantially prevent the formation of "liquid lock" and thereby preclude undesired lodgement of beer, etc., in the delivery pipe of the valve assembly. It will be appreciated that the potential lodgement of liquid in the delivery pipe over a long period is undesirable, from both the health view and the point of view of acceptability so far as taste is concerned of the next glass of beer dispensed by operation of the tap.

Illustrative embodiments of the invention will appear from the following particular description thereof, reference being made to the accompanying drawings in which:

FIG. 2 is a front elevation of the can with the valve assembly secured thereto;

FIG. 3 is a plan view corresponding to FIG. 1;

FIG. 12 is a side elevation of the apparatus shown in FIGS. 6, 7 and 10, showing the arcuate slots; and FIG. 13 shows part of FIG. 6 on an enlarged scale.

Figure 1:
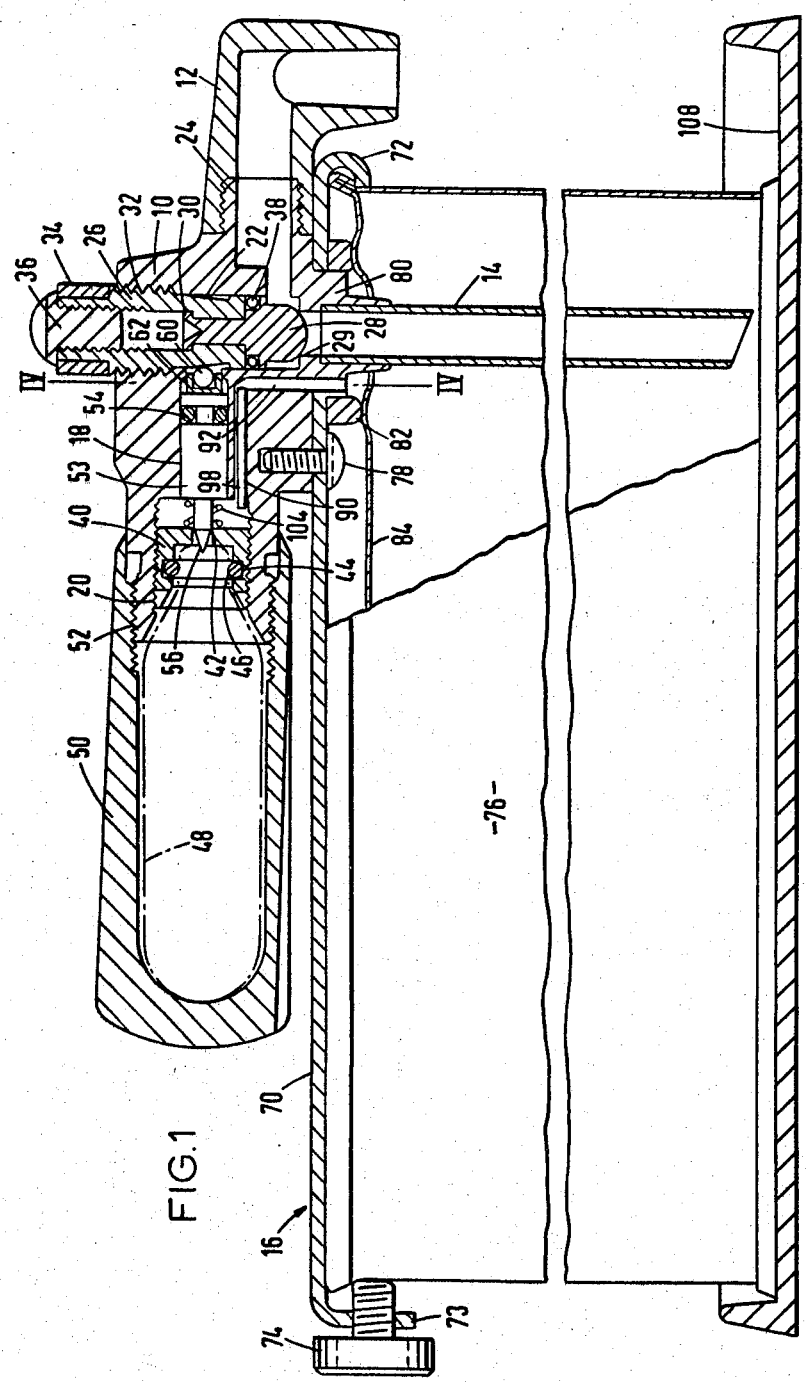
FIG. 1 is a side elevation of a beer can with the valve assembly secured thereto, the valve assembly and part of the can being shown in section.

The valve assembly illustrated in FIGS. 1–5 comprises a body 10, a tap outlet pipe 12, a depending tube 14 secured in a fluid tight but removable manner to the body 10 and extending almost to the bottom of the can, and clamping means generally indicated at 16.

The body 10 has a longitudinal bore 18 which has an enlarged portion shown at 20 and communicates with a transverse bore 22. The bore 22 communicates with a further bore 24 in registry with the tap outlet pipe 12. The bore 22 houses a valve actuating member 26, and a valve member 28. The former is externally threaded as shown at 32 and has fixed to it a handle 34 by which it can be rotated. The handle 34 is fastened to the valve actuating member 26 by a screw 36. The valve member 28 is secured to the valve actuating member 26 not only so that it can be raised or lowered thereby but also so that its part-spherical seating is self-aligning on the valve seat 29. These requirements are met by splaying (as seen at 30) the upper end of the valve member 28 within the valve actuating member 26 during assembly. The valve member 28 has a ring seal 38 by means of which leakage of liquid in an upward direction along bore 22 is prevented.

The lower part of the valve actuating member 26 tapers inwardly and is shaped approximately as a frustrum of a cone, but this taper does not extend completely to the end of the member 26. The purpose of the taper will be explained later.

The bore 20 is threaded and houses a cup-shaped member 40 which is correspondingly threaded externally. The member 40 has a central orifice 42, and an annular groove 44 to receive a ring seal 46. The cup-shaped member 40 is adapted to receive the puncturable end of a pressure bulb 48. The bulb may contain carbon dioxide or like pressurising gas in liquid form but a bulb containing any suitable gas under pressure could be used. The bulb 48 is housed within a casing 50 which is screwed onto an externally threaded part 52 of the body 10 as shown in FIG. 1.

Figure 5:
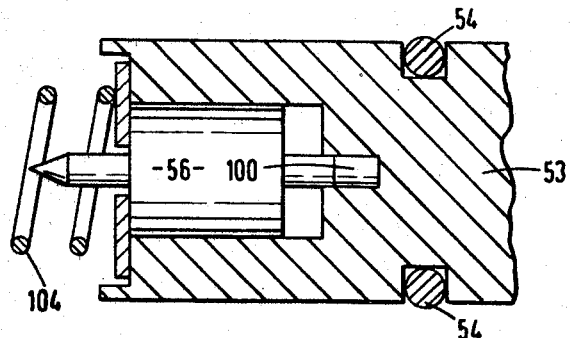
FIG. 5 is an enlarged view of a detail of the gas valve member 53.
Figure 4:
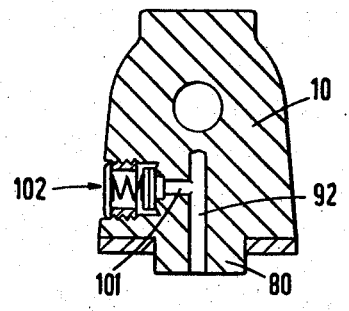
FIG. 4 is a scrap section of the line IV—IV of FIG. 1.

The bore 18 houses a gas valve member 53 having an annular groove to accommodate a seal 54. The gas valve member 53 is provided with a piercing/sealing pin 56 adapted to pass through the orifice 42 and to pierce the end closure of the pressurised bulb 48. A ball 60 mounted in a cup 62 formed on the gas valve member 53 is maintained in contact with the tapered portion of the valve actuating member 30 by a spring 104 held in compression by abutment of its ends against the cup-shaped member 40 and a shoulder formed on the gas valve member 53. When the valve actuating member 30 is in its closed position the ball is in contact with the member 30 at a point near the largest diameter of its taper. The piercing/sealing pin 56 is resiliently mounted within the gas valve member 53 against a resilient block 100 housed in a recess in the gas valve member 53, as shown in FIG. 5. Alternatively a resilient block can be located between the ball 60 and the cup 62.

The clamping means 16 comprises a strap 70 having a curved lip 72 at one end and a threaded bent over portion 73 carrying a clamping screw 74 at the other end. The strap is adapted to extend diametrically across the top of a "pipkin" beer can 76 (or any other similar liquid container) with the lip 72 and screw 74 engaging the curved wall of the can 76 under the rim of the can. The strap 70 is secured to the body 10 by means of a suitable number of screws, one of which is shown at 78. Being of springy metal the strap 70 can become bowed when the end wall of the can becomes convex under influence of increased internal pressure, and this assists in maintaining a gas-tight seal. A drip tray 108 is provided, and may be connected to or separate from the clamping means 16.

The body 10 has a downwardly projecting portion 80, within which the depending tube 14 is fitted in a fluid-tight manner but so that it can be removed for cleaning or for replacement, and carries an annular resilient sealing means 82 disposed around the portion 80. The seal 82 is adapted to engage with the upper wall 84 of the cam 76 and be urged thereagainst by the clamping means.

The body 10 has a small-diameter bore 90 parallel to the bore 18, which communicates with a bore or passage 92 extending downwardly and opening at the lower surface of the portion 80 of the body, and internally of the annular seal 82. The bore 90 is partially blocked by an obturating member 98, and the passage 92 has a side branch 100 connected to a pressure relief safety valve 102 which can vent to the atmosphere.

The operation of the above described device is as follows:

If the container is provided in its end with an aperture closed by a bung the bung is first removed; or an aperture is formed in its end where required. The depending tube 14, of a length appropriate to the length of the container, and of a smaller external diameter than the aperture is then inserted through the aperture and the valve assembly is then secured to the container by the clamping means 16. With the tap closed, that is to say, with the valve member 28 engaging valve seat 29 internally of the body 10, outflow of beer from the container 76 is blocked. The casing 50 is then removed, and a pressurised bulb 48 of carbon dioxide, for example a "Sparklets" (registered trademark) bulb, is placed within it. The casing 50 is then screwed onto the body 10. Over the final portion of movement caused by such screwing on, the piercing/sealing pin 56 pierces the end closure of the bulb 48, since the gas valve member 53 cannot move to the right as seen in the drawing because the ball 60 is in contact with the valve actuating member 26.

When it is desired to draw some beer from the container 76, the handle 34 is turned, in the "unscrewing" direction of thread 32, thereby raising valve actuating member 26 and the valve member 28 secured to it. When this occurs, the ball 60 is free to move slightly to the right because it rides down the taper generated on the valve actuating member 30. The compression spring 104 forces the gas valve member 53, cup 62 and ball 60 to the right, and after a delay due to the decompression of resilient block 100 the piercing/sealing pin 56 unseals the bulb.

Gas then escapes from the bulb and passes through orifice 42 and along bores 90 and 92 to the annular space between tube 14 and seal 82 and thence through the aperture in the end wall to the interior of the container 76, thereby increasing the pressure therein and forcing beer up tube 14, past open valve 28, 29 and out through the bore 24 and tap outlet pipe 12. The function of the obturating member 92 is to restrict the flow of gas and limit the pressure applied internally to the container 76 but this member may be unnecessary if the bores 90 and 92 are chosen of appropriate size to perform this function. If for some reason the desired limit of internal pressure is reached the pressure relief safety valve 102, seen in FIGURE 4, operates to vent gas from the container through bores 92 and 100.

When sufficient beer has been withdrawn, the handle 34 is rotated to move valve member 28 downwardly towards the outlet closed position. Simultaneously, the ball 60 and parts 62, 53, and 56 are forced to the left, as seen in the drawing, and the piercing/sealing pin 56 seals the hole it orginally punctured in the end closure of the bulb 48. Some movement of the valve member 53 takes place after the piercing/sealing pin 56 has engaged the bulb while the resilient block 100 is being compressed, and the arrangement is such that the gas flow ceases before liquid ceases to flow. This sequential operation of the liquid and gas valves is a desirable feature of the invention. One effect of the resilient block 100 is to conserve gas by delaying the flow of gas from the bulb to the container until after initial opening of the valve 28 and also terminating this flow before valve 28 has reclosed fully. Another effect is to achieve good sealing of the pierced hole in the bulb closure each time the valve is reclosed.

When the container 76 is empty, the clamping screw 74 can be unscrewed and the whole valve assembly removed for the replacement, if necessary, of the pressure bulb 48 by one that is fully charged and thus render it ready for use on a full container.

Various modifications and alternatives within the scope of the invention will now be briefly described.

Instead of extending diametrically across the top of the liquid container, the clamping means may extend the length of the container. Separate valves carried by the clamping means may be used respectively to control flow of gas into the container from a pressure bulb and to control flow of liquid from the container. These valves may be mechanically linked to allow gas to flow into the container only when liquid can flow from the container.

The valve mechanism with a single manually operable tap herein disclosed may be formed integral with the top part or lid of a liquid container, such a container having a closable opening through which liquid can be introduced before the container is pressurized by means of a pressure bulb such as a "Sparklets" (registered trademark) bulb. In another alternative, the valve mechanism could be applied either permanently or temporarily to the lid of a jug, and the jug could be filled with a beverage, the lid being subsequently closed and fixed in a closed position, before the bulb pressure is released by rotating the handle 34. It will be appreciated that other arrangements for adjusting the position of valve member 28 could be employed. For example, a simple lever system of the type employed in soda syphons could be used.

Referring now to FIGS. 6–13, the illustrated valve assembly comprises a body 10, a delivery pipe or spout 12, a depending tube 14 secured in a fluid tight but removable manner to the body 10 and of such a length as to extend almost to the bottom of the can, and clamping means generally indicated at 16. A pressure bulb (not shown) is housed within a casing 50 which screws onto the body 10, and its puncturable end is presented towards a piercing/sealing pin 56 forming part of a gas valve member generally indicated by numeral 53. The detailed construction of the gas valve is essentially the same as that illustrated in FIG. 1 herein.

Figure 6:
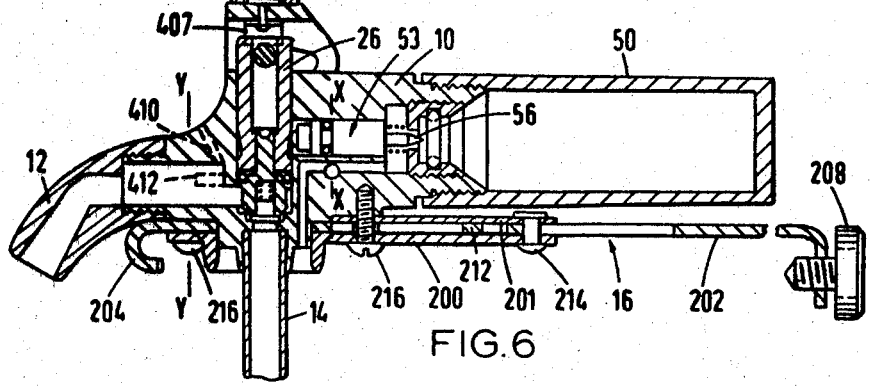
FIG. 6 is a vertical section through the second embodiment of valve assembly and means for clamping it to a container taken in a vertical plane.
Figure 7:
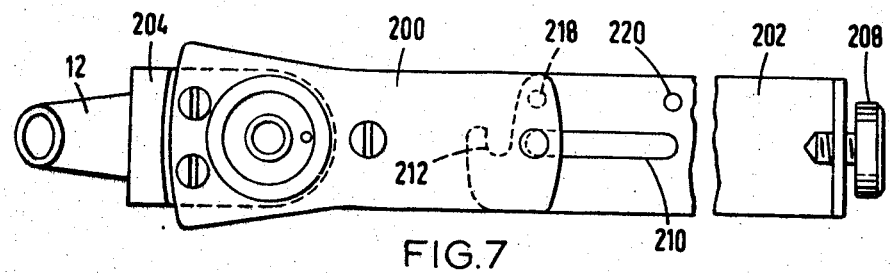
FIG. 7 is an underneath plan view of assembly shown in FIG. 6, showing a further embodiment of the clamping means.

The embodiment of clamping means 16 illustrated in FIG. 7 comprises elements 200, 201, 202 and 204, the last of which is bent-over as shown in FIG. 6 to engage the curved wall of a can (not shown) below the rim. The elements 200, 201 and 204 are bolted to the body 10 by bolts 216. The elements 200 and 201 are secured together by a rivet 214 (FIG. 6) passing through a slot 210 in element 202. The element 202 carries an adjusting screw 208 and has the longitudinal slot 210 and a hooked end portion 212. As seen best from FIG. 7, the right hand element 202 can take up two positions, the first of which is suitable for a large size can and in which the rivet 214 is located at the left hand end of the slot 210, and the second of which is suitable for a smaller size can and in which the hooked portion 212 is hooked around the fastening bolt 216. The facility which this construction offers for swinging the second element 202 laterally sideways so that it does not impede screwing on or screwing off of the bulb casing 50 when replacing a bulb is a useful feature which adds to the convenience to the user of the device.

The elements 200 and 202 are retained in linear relationship while the clamping strap is being tightened onto the can by a stud (not shown) on element 200 or 201 which can engage in a hole 218 or 220 (FIG. 7) on element 202 according to whether a large or small can is being dealt with.

At the top of the depending tube 14, a pressure-responsive valve is located whose valve member 300 (FIG. 13) when in its lowermost position closes the passageway between the interior of the can and the liquid valve member. The valve member 300 has the shape of a disc combined with a cylindrical block and may be an integral moulded plastics member. The cylindrical portion is mounted in a cylindrical recess or bore in the liquid valve member 28. A spring 302 urges pressure-responsive valve member 30 downwardly.

The liquid valve member 28 has a part-spherical seating 304 which engages with valve seat 29, to prevent exit of liquid from the can. The valve member 28 is moved upwardly by manual operation of the handle 400 when liquid is to be dispensed. As mentioned, a feature of the present invention is that upon such upward movement of liquid valve member 28, the abutment 304 formed by the end wall of the cylindrical recess is moved upwardly, and in consequence the force exerted by spring 302 on valve member 300 is reduced. The arrangement is such that the pressure-responsive valve will remain closed for pressures within the container less than, for example, 8 pounds per square inch when the liquid valve member 28 is in its closed position, progressively reducing to 4 pounds per square inch in its half-open position and to a fraction of a pound per square inch when the liquid valve member 28 is in its fully open position or nearly so. It will be appreciated that the operational parameters can be adjusted by varying the depth of the recess, the length of the cylindrical part of valve member 300, the distance of travel of valve member 28 between closed and open, and the spring force of spring 302.

The liquid valve member 28 is actuated by the handle 400 and is connected (as in the FIG. 1 embodiment) to a valve actuating member 26. A cross-head 402 (FIG. 10) is slidably mounted in the member 26, and its two ends extend into and slightly beyond arcuate slots 404 (seen best in FIG. 12) located in the two side limbs of a U-shaped member 406 to which the handle 400 is fixed. Cross-head 402 is retained within the member 26 and slots 404 by spring clips 405.

A leaf spring 407 is lodged between the U-shaped member 406 and the cross-head 402 and serves to bias the handle 400 towards its upright position and valve actuating member 26 towards its closed position.

The member 406 is pivotally attached to the body 10 by pivot pins 408 (FIGS. 10 and 11) and the arrangement is such that the handle 400 can be pivoted anticlockwise as seen in FIGS. 6 and 12 to open the liquid valve by raising the valve actuating member 26 and valve member 28. The lower sides of the slots 404 serve as cam surfaces to effect opening of the liquid valve and the upper surfaces act to effect closure in a similar way. As fully explained in connection with FIG. 1, movement of valve actuating member 26 opens gas valve 53, and in the present construction, in one specific embodiment of practical utility, the arrangement is such that:

(1) in the vertical position, both the gas and liquid valves are closed;
(2) upon movement of handle 400 from the vertical to a position about 20° from the vertical, the liquid valve opens but the gas valve remains closed; and
(3) from about 20° to the vertical to the fully open position (say 45° to the vertical) of the handle 400 both valves are fully open.

As has been previously explained, the pressure required to open valve member 300 progressively decreases as the handle 400 is moved from the vertical position and over the last portion of the movement, the pressure-responsive valve is forced open by only slight pressure internally of the can.

The body 10 may have a vent hole shown dotted and by numeral 410 to prevent formation of a "liquid lock" in the delivery pipe 12. If necessary, to prevent liquid being discharged through this vent hole during normal operation a flange indicated by the reference 412 can be provided internally in the body 10. This can easily be done if the body 10 is of plastics material and is produced by a moulding technique. The flange 412 ensures that the liquid as it leaves under pressure is guided past the inner end of the vent hole and so does not escape through it. In an alternative embodiment, the vent hole 410 may be bored in a direction parallel to the direction of movement of the valve actuating member 26 to communicate with the interior of pipe 12 at its inward extremity. The outer end of such a vent hole 410 can be plugged by a plug having only a small orifice to minimize the risk of escape therethrough of the liquid being dispensed.

Figure 11:
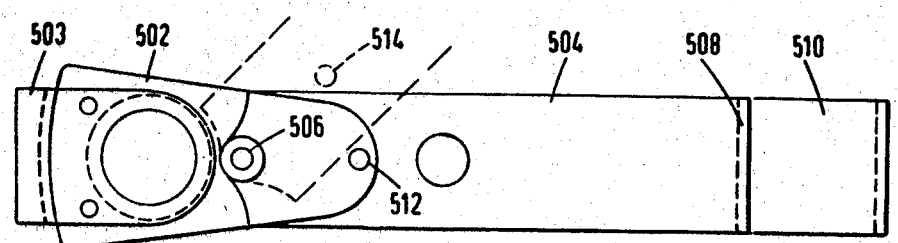
FIG. 11 is a plan view corresponding to FIG. 7 and showing yet another embodiment of clamping means.

An alternative embodiment of clamping means is illustrated in FIG. 11. The clamping means comprises elements 502, 503 and 504 and element 503 has a lip corresponding to lip 204 of FIG. 6 and lip 72 of FIG. 1. Elements 502 and 503 are secured to the body 10. The element 504 is in the form of a plain metal strap having a hole 506 by which it can be pivotally secured to body 10 and element 502 at one end and a turned-over part 508 at the other end. This part 508 carries a clamping screw (not shown) corresponding to screw 74 of FIG. 1 and screw 208 of FIG. 6. The elements 502 and 504 are secured together by the screw 216 (FIG. 6) which assists in attaching the element 502 (or 200) to the body 10. The part 504 is of a length appropriate to a small (e.g. 4 pint) beer can, and an alternative part 510 of a length appropriate to a large (e.g. 7 pint) beer can is supplied with the valve assembly. The element 502 has a stud 512 which can co-operate with a hole 514 in the element 504 or a corresponding hole (not shown) in the longer element 510 to maintain the elements 502, 504 (or 502, 510) in proper linear relationship while the clamping means is being applied to a container.

Figure 8:
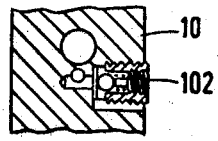
FIG. 8 is a scrap section on the line X—X of FIG. 6.
Figure 9:
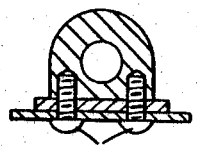
FIG. 9 is a scrap section on the line Y—Y of FIG. 6.
Figure 10:
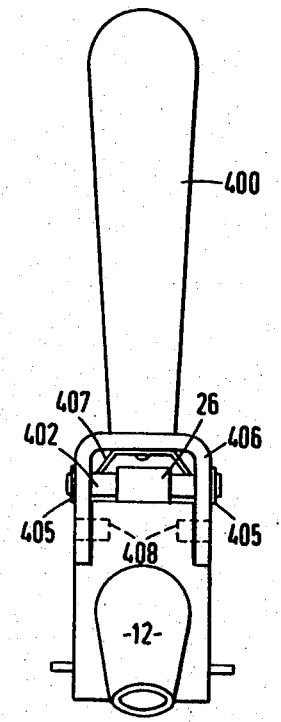
FIG. 10 is a front elevation of the apparatus shown in FIG. 6.

FIG. 8 shows a pressure relief valve 102 which corresponds in function and construction to that shown on FIG. 1.

It will be appreciated that modifications can be made to the apparatus disclosed without departing from the present invention. For example, other mechanical connections than the cross-head and cam-slot disclosed could be used to transfer the motion of the handle to the valve member 28. The pressure required to open the pressure-responsive valve can be adjusted by a screw or other adjustment instead of in response to the position of valve member 28.

We claim:

1. A valve assembly suitable for attachment to a cylindrical liquid container, comprising a valve mechanism including a manually operable tap adapted to control flow of liquid from the container, and including a tube depending from the valve mechanism and adapted to extend through an aperture in one end wall of the container and down below the liquid surface, clamping means adapted to grip the container and to position the valve mechanism so that the tube extends through the said aperture, annular sealing means surrounding the said aperture and compressed against the end wall of the container by the clamping means, a holder for a bulb of compressed gas such as carbondioxide, carried by the clamping means, gas from the bulb being arranged to enter the container through the aperture and within the annular sealing means, and the said manually operable tap being arranged to control both a valve member controlling the outflow of liquid and a gas valve member controlling release of the gas from the bulb, the said assembly including a pressure-responsive valve being arranged so that liquid can only flow from the container to the exterior when the pressure in the container is greater than a predetermined level.

2. A valve assembly according to claim 1, in which the said pressure-responsive valve comprises a valve member urged to its closed position by a spring, and a spring seat acting as an abutment for the spring is on or forms part of a movable valve member comprising part of the said valve mechanism controlling liquid flow from the container.

3. A valve assembly according to claim 1, in which the manually operable tap is movable in a vertical plane, and is linked to the valve member of the liquid-controlling valve by a mechanical connection comprising an arcuate slot whose two sides serve as cam surfaces engaging a cross-head attached to the valve member to provide a positive opening and closing drive for the said valve member.

4. A valve assembly suitable for attachment to a cylindrical liquid container, comprising a valve mechanism including a manually operable tap adapted to control flow of liquid from the container, and including a tube depending from the valve mechanism and adapted to extend through an aperture in one end wall of the container and terminate adjacent the opposite end wall, clamping means adapted to grip the container and to position the valve mechanism so that the tube extends through the said aperture, said clamping means being in the form of an adjustable strap having two elements, one of which is slidable relative to the other, and the elements being hooked or otherwise shaped to be engageable one with the other at a plurality of selectable positions to give overall strap lengths appropriate to containers of different sizes, annular sealing means surrounding the said aperture and compressed against the end wall of the container by the clamping means, a holder for a bulb of compressed gas, such as carbon dioxide, carried by the clamping means, gas from the bulb being arranged to enter the container through the aperture and within the annular sealing means, and the said manually operable tap being arranged to control both a valve member controlling the outflow of liquid and a gas valve member controlling release of the gas from the bulb, in which assembly the clamping means includes flexible strap means capable of extending diametrically across the end of the liquid container, and the said strap means has at each end means for clipping over the rim of the container at each end of the diameter and for engaging the curved wall of the container adjacent to the said rim.

5. A valve assembly suitable for attachment to a cylindrical liquid container comprising: (A) a valve mechanism including a manually operable tap and a liquid valve member thereof adapted in cooperation to control flow of liquid from the container; (B) a tube in fluid communication with the tap and depending from the valve mechanism and adapted to extend through an aperture in one end wall of the container and terminate adjacent the opposite end wall; (C) clamping means adapted to grip the container and to position the valve mechanism so that the tube extends through said aperture; (D) annular sealing means surrounding the said aperture and compressed against the end wall of the container by the clamping means; (E) a holder for a bulb of compressed gas, such as carbon dioxide, carried by and fixed in relation to the clamping means; (F) the said valve mechanism including (a) a valve actuating member in operative relationship with the said tap and with the said liquid valve member; and (b) a gas valve member including a piercing/sealing pin adapted to pierce an end of the said bulb and capable of sealing the orifice so produced; (G) the said valve actuating member having a cam surface arranged to effect upon movement thereof by the agency of the tap movement of the said pin in a direction longitudinal of the pin to allow escape of gas into the container.

6. A valve assembly according to claim 5, in which the tap is constructed and arranged so as to effect sequential control of the liquid and gas valve member so that the former opens before and closes after the latter.

7. A valve assembly according to claim 5, wherein the clamping means includes a strap element adapted at one end to engage the lip of the cotnainer and the strap element carries a securing screw or the like by which a selected one of several other strap elements of lengths appropriate to the size of the container involved can be secured to the valve assembly.

8. A valve assembly according to claim 5, having a delivery pipe or spout which is provided with a vent hole whose inner end is located close to the valve member of the main liquid valve.

9. A valve assembly according to claim 5, wherein the clamping means includes a flexible strap which carries at one end an adjustable clamping screw for engaging the curved wall of the container.

10. A valve assembly according to claim 5 in which the said clamping means includes a flexible strap capable of extending diametrically across the end of the liquid container and clipping over the rim of the container at each end of the diameter.

11. A valve assembly according to claim 10, in which the strap has a curved clip at one end and a clamping screw at the other end.

References Cited

UNITED STATES PATENTS

| 1,296,447 | 3/1919 | Whitney | 222—89 XR |
| 2,189,643 | 2/1940 | Ward | 222—400.7 XR |
| 2,367,077 | 1/1945 | Ward | 222—400.7 XR |
| 2,740,666 | 4/1956 | Boulay | 222—89 XR |
| 2,753,080 | 7/1956 | Bartlett | 222—82 |

FOREIGN PATENTS

| 98,965 | 8/1898 | Germany. |

WALTER SOBIN, *Primary Examiner.*

U.S. Cl. X.R.

222—400.7, 82, 89